United States Patent
McNatt (10) Patent No.: US 10,676,013 B1
(45) Date of Patent: Jun. 9, 2020

(54) SYSTEM AND METHOD FOR SECURING CYLINDRICAL COTTON BALES ON A TRAILER

(71) Applicant: Perry McNatt, Elkmont, AL (US)

(72) Inventor: Perry McNatt, Elkmont, AL (US)

(*) Notice: Subject to any disclaimer, the term of this patent is extended or adjusted under 35 U.S.C. 154(b) by 0 days.

(21) Appl. No.: 16/585,024

(22) Filed: Sep. 27, 2019

(51) Int. Cl.
*B60P 7/15* (2006.01)

(52) U.S. Cl.
CPC ........................... *B60P 7/15* (2013.01)

(58) Field of Classification Search
CPC ...... B60P 7/12; B60P 7/15; B60P 3/41; B62D 33/0207; B62D 33/0215; B61D 45/003; B61D 3/16; B65D 85/08; B65D 85/20
USPC ............ 410/37, 36, 42, 47, 49, 153
See application file for complete search history.

(56) References Cited

U.S. PATENT DOCUMENTS

| | | | | |
|---|---|---|---|---|
| 2,588,278 A * | 3/1952 | Noerr | ........................ | B60P 7/12 206/391 |
| 2,810,602 A * | 10/1957 | Abrams | ............... | B61D 45/003 410/42 |
| 3,061,255 A * | 10/1962 | Gallo | .................... | B61D 45/003 410/48 |
| 3,291,073 A * | 12/1966 | James | .................... | B61D 45/008 410/49 |
| 3,508,503 A * | 4/1970 | Daly | ..................... | B61D 45/003 410/49 |
| 3,715,993 A * | 2/1973 | Orlik | ..................... | B61D 45/003 410/48 |
| 3,826,515 A * | 7/1974 | Slayton | ................ | A01D 90/083 280/791 |
| 3,977,717 A * | 8/1976 | Hassell | ...................... | B60P 7/12 296/43 |
| 4,576,531 A * | 3/1986 | Cosnet | .................. | A01D 90/08 410/36 |
| 4,580,843 A * | 4/1986 | Lund | .................... | A01D 90/083 105/239 |
| 4,784,546 A * | 11/1988 | Johnson | ............... | A01D 90/083 296/8 |

(Continued)

FOREIGN PATENT DOCUMENTS

| | | | | |
|---|---|---|---|---|
| BE | 883374 A | * | 9/1980 | ................ B61F 3/16 |
| DE | 3514975 A1 | * | 10/1986 | .............. B60P 3/035 |

(Continued)

*Primary Examiner* — Hilary L Gutman
(74) *Attorney, Agent, or Firm* — Lanier Ford Shaver & Payne; Gerald M. Walsh (57) ABSTRACT

A system for securing large, heavy cylindrical cotton bales on a trailer, the system using front and rear support frames reversibly attached to a trailer bed with a plurality of spaced apart middle support frames therebetween. The middle support frame consists of a top frame and a bottom frame wherein the bottom frame is reversibly attached to the trailer bed. The top and bottom frames are connected to each other with a vertical side beam and with spaced apart angled beams. The front end and rear ends of the top frame are connected to each other with top cross beams. The spaced apart angled beams form retaining spaces causing at least some of the surface of a bale to become embedded in the retaining spaces, thereby preventing sideways, forward and backward movement of the bale. A retaining bar attached rotatably to the vertical side beams also prevents sideways movement.

20 Claims, 7 Drawing Sheets

(56) References Cited

U.S. PATENT DOCUMENTS

| | | | | |
|---|---|---|---|---|
| 5,048,885 | A | * | 9/1991 | Bomar ................. A01D 87/127 |
| | | | | 296/6 |
| 5,193,700 | A | * | 3/1993 | Lyman ..................... B60P 7/12 |
| | | | | 206/386 |
| 5,567,096 | A | * | 10/1996 | Howard .................... B60P 3/41 |
| | | | | 403/2 |
| 10,144,336 | B1 | * | 12/2018 | Wadsworth ............... B60P 7/12 |
| 10,219,438 | B1 | | 3/2019 | Studebaker, Jr. |
| 2006/0013666 | A1 | * | 1/2006 | Halliar ..................... B60P 7/12 |
| | | | | 410/77 |
| 2007/0166132 | A1 | * | 7/2007 | Couture ................. A01D 90/08 |
| | | | | 414/111 |
| 2010/0320729 | A1 | * | 12/2010 | Ehrlich .................... B60P 7/12 |
| | | | | 280/423.1 |
| 2011/0311338 | A1 | | 12/2011 | Patrick et al. |
| 2015/0104285 | A1 | * | 4/2015 | Quinn ..................... B60P 7/135 |
| | | | | 414/800 |
| 2016/0167563 | A1 | * | 6/2016 | Nelson ..................... B60P 7/12 |
| | | | | 410/47 |
| 2017/0217450 | A1 | * | 8/2017 | Thompson ............... B61D 3/16 |

FOREIGN PATENT DOCUMENTS

| | | | | | |
|---|---|---|---|---|---|
| FR | | 1516986 | A * | 2/1968 | ......... B65D 19/0095 |
| FR | | 2497162 | A1 * | 7/1982 | ............... B61D 3/04 |
| WO | WO-2019084594 | A1 * | 5/2019 | ............. B62D 21/20 |

\* cited by examiner

FIG. 15

SYSTEM AND METHOD FOR SECURING CYLINDRICAL COTTON BALES ON A TRAILER

FIELD OF THE INVENTION

This invention relates to a trailer for transporting large cylindrical bales of crop material such as cotton or hay and, more particularly, to a trailer for hauling cylindrical cotton bales that uses support frames to retain and stack up to 48,000 pounds of baled cotton and to secure the baled cotton for transportation, wherein securing and un-securing processes can be completed within four to ten minutes.

BACKGROUND OF THE INVENTION

Figure 1:
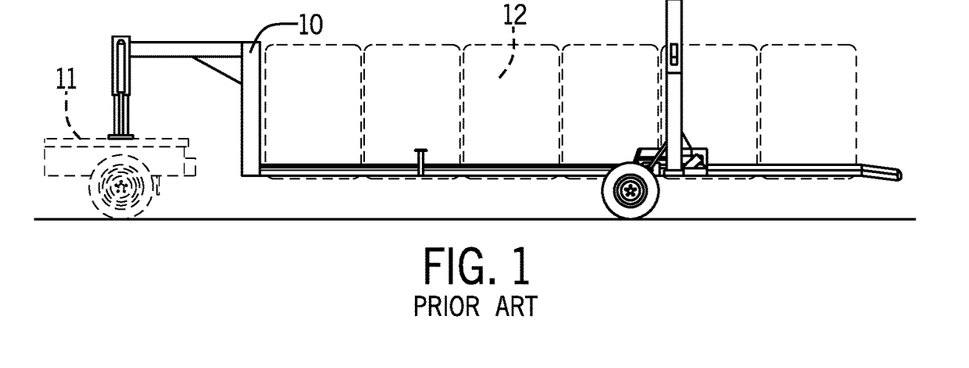
FIG. 1 shows side view of a prior art trailer with bales placed in line thereon.

It is customary to bind harvested cotton in cylindrical bales through the use of automated baling equipment. These cylindrical bales are then picked up for transportation to a desired location, such as a cotton gin facility, for processing or storage. The bales are large and heavy, typically weighing 5,000 to 6,000 pounds per bale, with a diameter of about six feet and a length of about 6 feet, and are, thus, too large and heavy to be manually handled. These bales may be place on a trailer in linear sequence and then must be secured for transport. FIG. 1 shows an example of a trailer 10 attached to a vehicle 11 with bales 12 lined up on the trailer 10. If transporting is on public highways, then it is necessary to use complex rigging or straps and tensioning devices to prevent the bales from falling off the trailer during transportation. This securing process can take one to two hours or more. Unloading the bales at a destination takes another one to two hours. It is desirable to have a trailer system for cotton bales that will require only a few minutes to secure the cotton bales for transportation and only a few minutes to release the cotton bales for unloading.

SUMMARY OF THE INVENTION

The present invention provides a system for securing cylindrical bales on a trailer. The system has a middle support frame consisting of a top frame and a bottom frame. Each top frame and bottom frame have a first side, a second opposite side, a front end, and a rear end. The bottom frame is, preferably, trapezoidal shaped and is reversibly attached to a top surface of a trailer. The top and bottom frames are spaced apart and connected to each other on their first and second sides with a centrally located vertical side beam, thereby forming first and second sides of the middle support frame. The top and bottom frames are connected to each other on their front ends and rear ends with spaced apart angled beams, thereby forming a front end and rear end of the middle support frame. The front end and rear end of the top frame are connected to each other with top cross beams, thereby forming a top end of the middle support frame. A retaining bar is attached rotatably to the vertical side beams that prevents a cylindrical bale on the top end of the middle support frame from moving from one side of the top frame towards the other opposite side of the top frame. The spaced apart angled beams form retaining spaces in the middle support frame and cause at least some of the surface of a bale to become embedded therein, thereby preventing sideways movement of the bale across the front end or rear end of the middle support frame.

The retaining bar rotates towards the top frame thereby raising the retaining bar to secure a bale for transportation. The retaining bar rotates away from the top frame thereby lowering the retaining bar to unsecure the bale for removing the bale after transportation. The retaining bar and the vertical side beam form a locking pin assembly, wherein a locking pin on a bottom end of the retaining bar is biased to extend into a locking pin plate positioned near a bottom end of the vertical side beam and wherein the locking pin plate has an opening to receive the locking pin, thereby reversibly locking the retaining bar in a raised position.

The system also has a front support frame and a rear support frame. Preferably, three middle support frames are positioned and spaced apart between the front support frame and the rear support frame. The front support frame has a bottom frame and a top beam which is connected to a front end of the bottom frame with vertical front beams. Angled rear beams connect the top beam to a rear end of the bottom frame. Angled side beams connect front ends of the bottom frame to a middle area of angled rear beams. A retaining bar is attached rotatably to the angled side beams. The angled rear beams form retention spaces in the front support frame, the retention spaces causing at least some of the surface of a bale to become embedded therein, thereby preventing sideways movement of a bale across the front support frame. The front support frame is angled such that a bale on the front support frame cannot move forward beyond the front end of the trailer.

The rear support frame has a bottom frame and an angled vertical back frame attached to a rear end of the bottom frame, thereby forming an angled vertical backside of the rear support frame. The bottom frame has horizontal cross beams and the angled vertical back frame has angled vertical cross beams. The horizontal cross beams create retention spaces in the bottom frame and the angled vertical cross beams create retention spaces in the angled vertical back frame. The retention spaces cause at least some of the surface of a bale to become embedded therein, thereby preventing sideways movement of a bale across the rear support frame. The rear support frame is angled so that a bale on the rear support frame cannot move backward beyond the rear end of the trailer.

A circular bale weighing 5,000 to 6,000 pounds can be placed above each middle support frame, between adjacent middle support frames, between a middle support frame and a front support frame, on the front support frame, and on the rear support frame. Up to eight of these cylindrical bales can be placed on the trailer bed and easily secured for transportation using these support frames.

An advantage of the present invention is a system for easily and quickly securing large heavy cylindrical bales of cotton to a trailer for transportation.

Another advantage is a system that makes it easy and quick to unsecure and unload large heavy cylindrical bales of cotton after transportation.

Another advantage is support frames that are reversibly attachable to a trailer allowing the trailer to be used for purposes other than transporting large, heavy bales of cotton.

Another advantage is the elimination of straps and complex rigging to secure large, heavy bales of cotton to a trailer.

Another advantage is easy to use rotatable retaining bars that allow stacking of cotton bales on the tops of the support frames.

Another advantage is support frames that are relatively easy and inexpensive to manufacture.

DETAILED DESCRIPTION OF THE INVENTION

While the following description details the preferred embodiments of the present invention, it is to be understood that the invention is not limited in its application to the details of arrangement of the parts or the illustrations disclosed herein, since the invention is capable of other embodiments and of being practiced in various ways.

Figure 2:
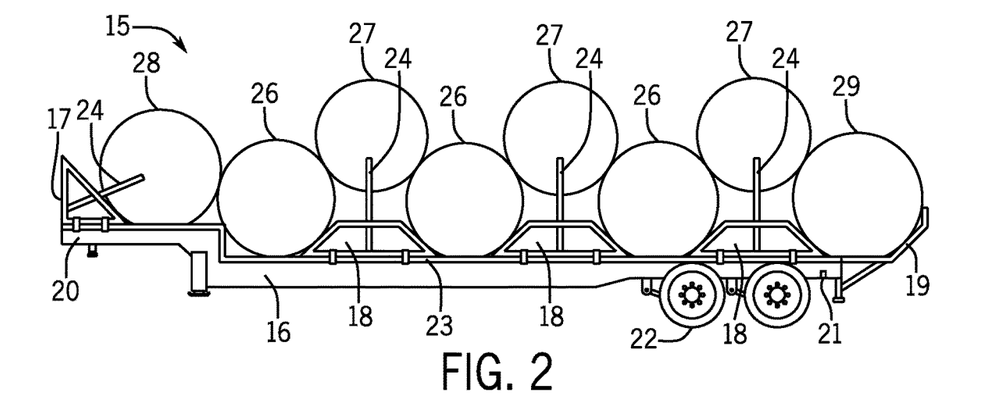
FIG. 2 shows a side view of the system of the present invention using front, middle, and rear support frames to secure large cotton bales on a trailer without the use of complex rigging or straps.

FIG. 2 shows a side view of the system 15 of the present invention for transporting cylindrical cotton bales on a trailer 16 using front 17, middle 18, and rear 19 support frames to secure the bales on the trailer 16 without the use of complex rigging or straps. The trailer 16 has a front end 20, a rear end 21, wheels 22, and a top surface 23. The front 17 and middle 18 support frames have retaining bars 24 which are shown in a raised position. The front support frame 17 is reversibly attached to the front end 20 of the trailer 16 and the rear support frame 19 is reversibly attached to the rear end 21. The middle support frames 18 are spaced apart and are reversibly attached to the top surface 23 of the trailer 16 between the front frame 17 and the rear frame 19. Bales 26 are placed on the top surface 23 of the trailer between or adjacent to the middle support frames 18. Bales 27 are placed above the middle support frames 18 between adjacent bales, bale 28 is placed on the front support frame 17, and bale 29 is placed on the rear support frame 19. The retaining bars 24 are rotated to a raised position so that they engage the bales 27 on the middle support frames 18 and the bale 28 on the front support frame 17. The raised retaining bars 24 prevent the bales from moving sideways from one side of the trailer 16 to an opposite side of the trailer 16. The front support frame 17 is angled such that the bale 28 on the front support frame 17 cannot move forward beyond the front end 20 on the trailer 16. The rear support frame 19 is angled so that the bale 29 on the rear support frame 19 cannot move backward beyond the rear end 21 of the trailer 16. Because all the bales make contact with each other from the front end 20 to the rear end 21 of the trailer 16, they cannot move forward or backward. The bales 26 that contact the sides of the middle support frames 18 and the top surface 23 of the trailer 16 cannot move sideways because of the friction encountered by the bales 26 with the middle support frames 18 and the top surface 23.

Figure 3:
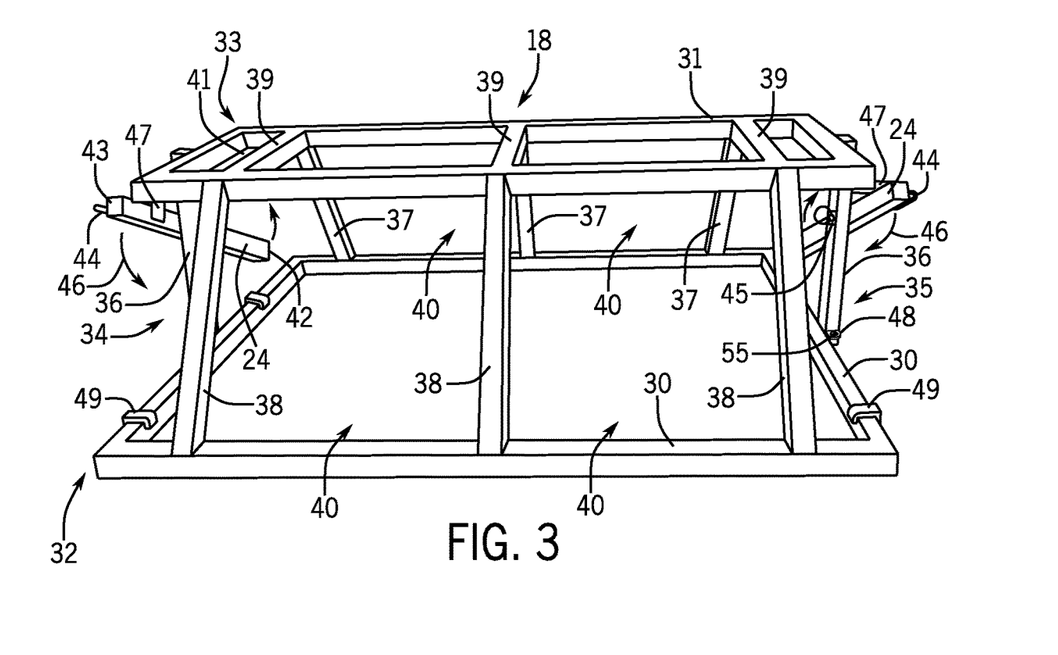
FIG. 3 shows a rear perspective view of a middle support frame of the present invention with retaining bars in a lowered position.

FIG. 3 shows a rear perspective view of a middle support frame 18 of the present invention with retaining bars 24 in a lowered position. The middle support frame 18 consists of a bottom frame 30, a top frame 31, a rear end 32, a front end 33, a right side 34, and a left side 35. Vertical side beams 36 connect the bottom frame 30 to the top frame 31. Angled front beams 37 at the front end 33 form a front side of the middle support frame 18 and angled rear beams 38 at the rear end 32 form a rear side of the middle support frame 18. Top cross beams 39 extend from the front end 33 of the top frame 31 to the rear end 32 of the top frame 31.

The angled front beams 37 and the angled rear beams 38 form retention spaces 40 in the middle support frame 18. When a cotton bale 26 is placed adjacent to retention spaces 40, some of the surface of the cotton bales will settle into the retention spaces 40 and become imbedded therein because of the heavy weight of the cotton bales. Once settled and imbedded, the cotton bales 26 are restricted from moving towards the right side 34 or the left side 35 of the middle support frames 18. The cotton bales 27 above the middle support frames 18 are restricted from moving from one side to the other by the retaining bars 24. Since cotton bales 27 are wedged between adjacent bales, cotton bales 27 are restricted from moving to the front or back.

The retaining bars 24 are attached rotatably to the vertical side beams with a bolt 45. The retaining bars 24 have a top end 42, a bottom end 43, and a handle 44 near the bottom end 43. The handle 44 is used to pull the bottom end 43 of the retaining bar 24 downward, shown by arrows 46, which will rotate the retaining bar 24 to a raised position wherein it will extend across the side of a bale towards the center of the bale (see FIG. 2). A stop member 47 on the retaining bar 24 contacts the vertical side beam 36 when the retaining bar 24 is in a raised position. The vertical side beam 36 has a locking pin plate 48 at the bottom end of the vertical side beam 36 where the vertical side beam 36 attaches to the side of the bottom frame 30. The bottom frame 30 may have clamps 49 to attach the bottom frame 30 to the top surface 23 of the trailer 16.

Preferably, the width of the top frame between the front end and the rear end is less than that of the bottom frame. This configuration provides a trapezoidal shape to the middle support frame 18. The trapezoidal shape facilitates placement of the bales adjacent the front and rear ends of the middle support frames and facilitates the settling and embedding of the bale surface into the retention spaces.

Figure 4:
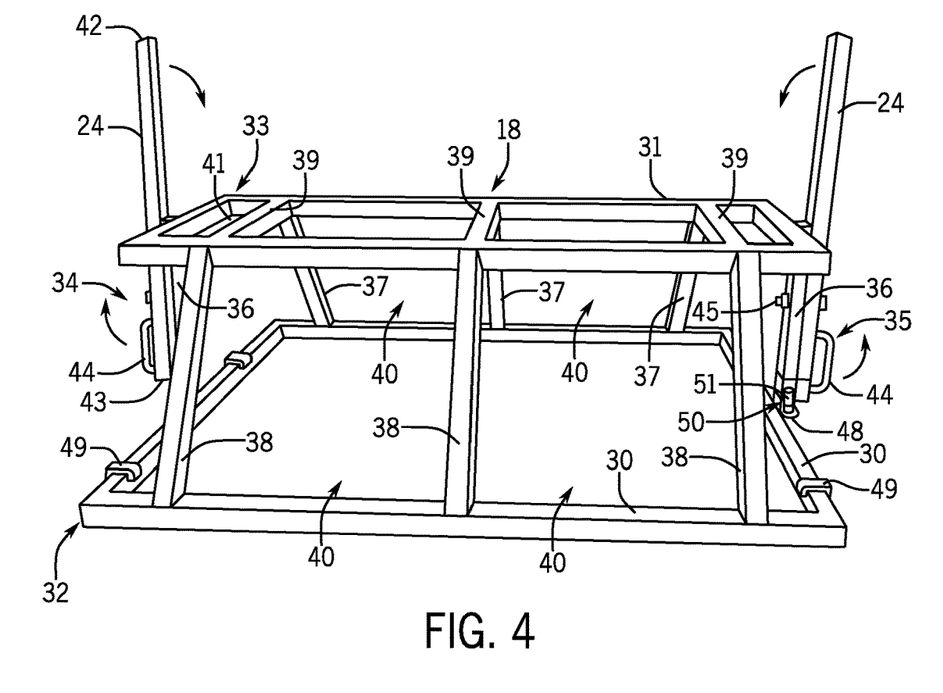
FIG. 4 shows a front perspective view of the middle support frame with the retaining bars in a raised position.

FIG. 4 shows a front perspective view of the middle support frame 18 with the retaining bars 24 in a raised position. FIG. 4 further shows a locking pin assembly 50 at the bottom end 43 of the retaining bar 24 and attached to the bottom stop member 47. The locking pin assembly 50 reversably locks to the locking pin plate 48.

Figure 5:
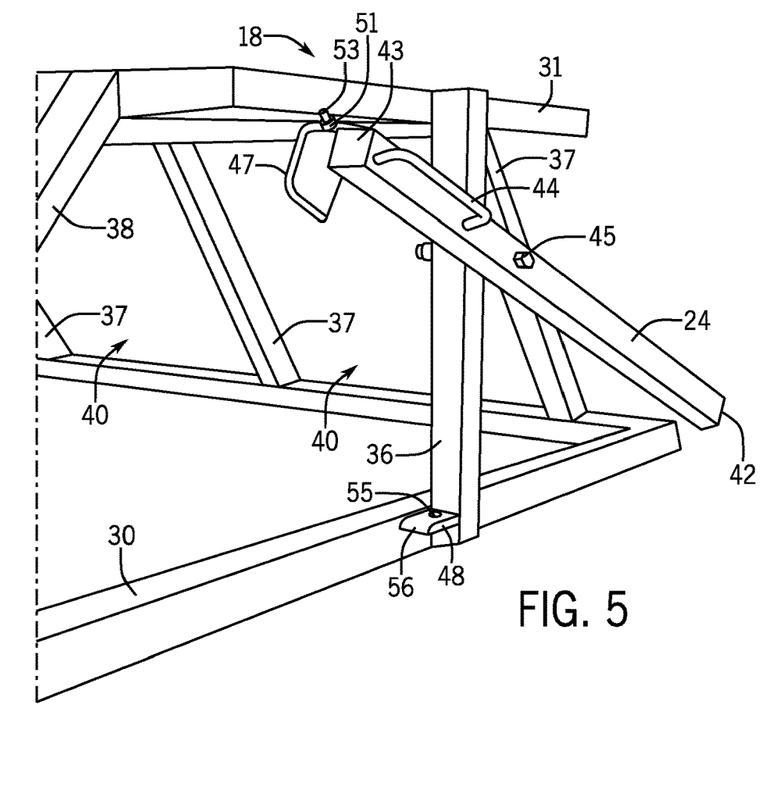
FIG. 5 shows a left side perspective view of the middle support frame with the retaining bar in a lowered position.
Figures 6, 7:
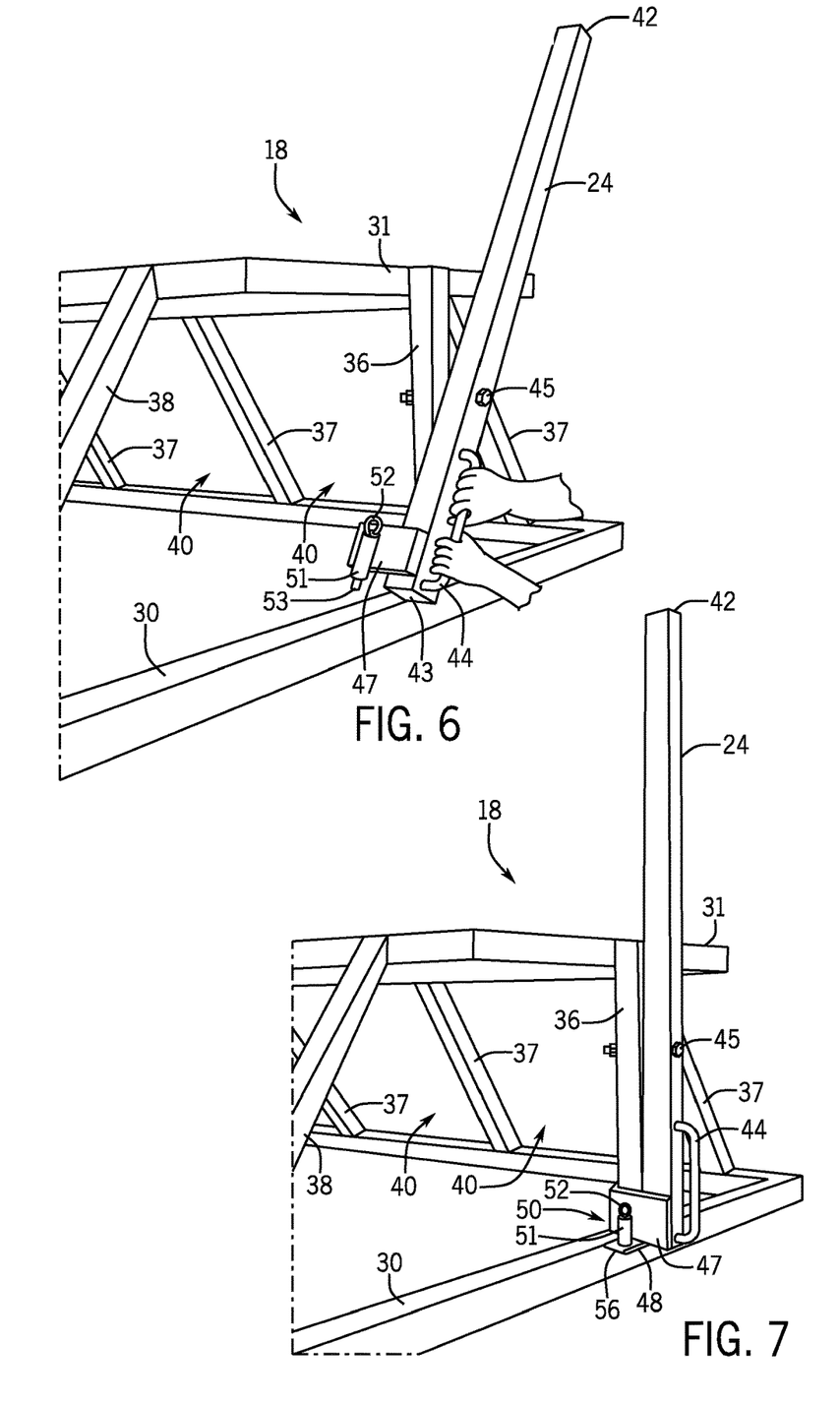
FIG. 6 shows a left side perspective view of the middle support frame with the retaining bar being rotated towards a raised position.
FIG. 7 shows a left side perspective view of the middle support frame with the retaining bar in a fully raised position and reversibly locked in this configuration.

FIG. 5 shows a left side perspective view of the middle support frame 18 with the retaining bar 24 in a lowered position. FIG. 5 further shows the locking pin 53 extending from the locking pin housing 51 of the locking pin assembly 50. FIG. 5 also shows the locking pin plate 48 having a curved edge 56 so that the locking pin 53 slidably engages the locking pin plate 48 to push the locking pin 53 into the locking pin housing 51. The locking pin plate 48 has an opening 55 to receive the locking pin 53. FIG. 6 shows a left side view of the middle support frame 18 with the retaining bar 24 being rotated towards a raised position. The handle 44 is shown being pushed downward to raise the retaining bar 24 to a vertical position. The locking pin 53 has a handle 52 to pull the locking pin 53 upward into the locking pin housing 51 so that it does not extend from the locking pin housing 51. FIG. 7 shows the retaining bar 24 in a raised, vertical position with the locking pin assembly 50 locked to the locking pin plate 48. In this configuration, the retaining bar 18 is locked into a raised position where it will extend up the side of a bale and prevent the bale moving from side to side.

Figure 8:
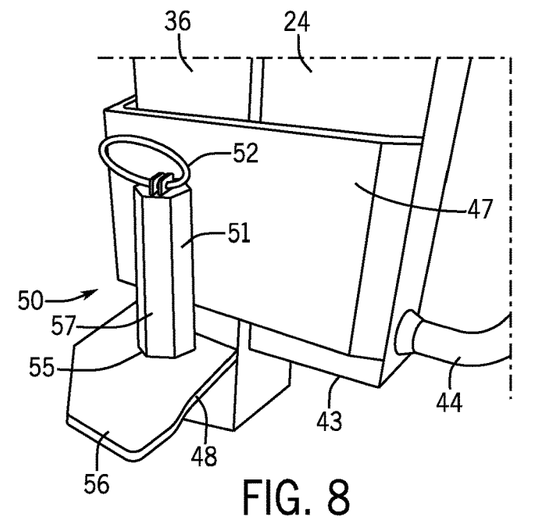
FIG. 8 shows an enlarged perspective view of a locking mechanism of the retaining bar.

FIG. 8 shows an enlarged view of the locking pin assembly 50. The locking pin assembly 50 consists of a housing 51 with a locking pin 53 inside. The locking pin 53 is biased to extend out of a bottom end 57 of the locking pin housing 51, for example, by means of a spring. The upper end of the locking pin 53 has a handle 52 which is used to pull the locking pin 53 upward in to the locking pin housing 51 so that it does not extend out of the bottom end 57 of locking pin housing 51. The locking pin assembly 50 also consists of a locking pin plate 48 having a curved edge 56 and an opening 55. The locking pin housing 51 is attached to the bottom stop member on the retaining bar 24. The locking pin plate 48 is attached to the vertical side beam 36 near its bottom end. As the retaining bar 24 is continuously rotated to its locked raised position, the locking pin 53 strikes the curved edge 56 of the locking pin plate 48. The locking pin 53 is then pushed up into the locking pin housing 51 and remains there until the locking pin housing 51 is over the opening 55 in the locking pin plate 48. When the locking pin housing 51 is over the opening 55 the downward biased locking pin 53 is pushed downward through the opening 55, thereby locking the retaining bar 24 to the vertical side beam 36 in a vertical, raised position. The retaining bar 24 is unlocked from the vertical side beam 36 by pulling up on the locking pin handle 52 and pulling the locking pin 53 out of the opening 55 in the locking pin plate 48.

Figure 9:
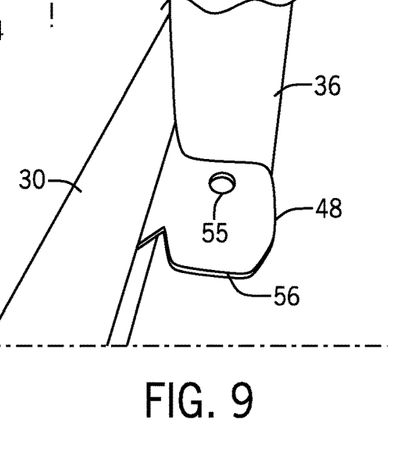
FIG. 9 shows an enlarged perspective view a locking pin receptacle.
Figure 10:
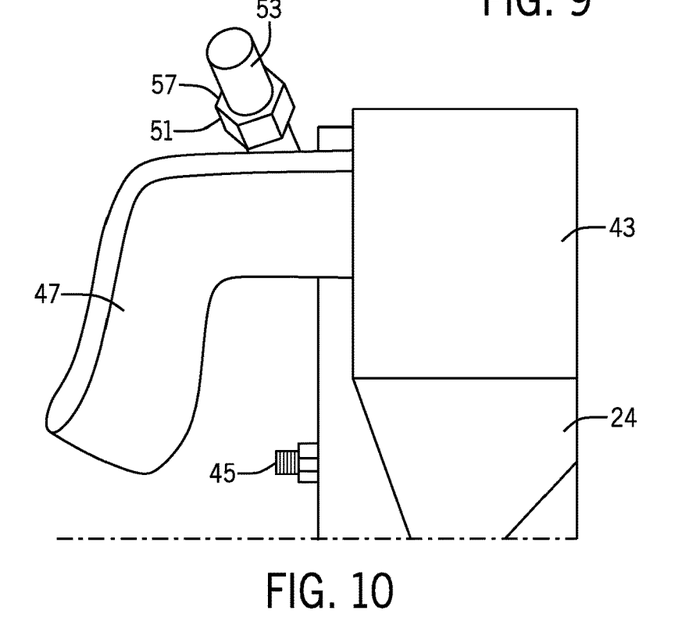
FIG. 10 shows an enlarged perspective view of the locking pin.

FIG. 9 shows an enlarged view of the locking pin plate 48. FIG. 10 shows an enlarged view of the bottom end 43 of the retaining bar 24, the locking pin housing 51, and the locking pin 53.

Figure 11:
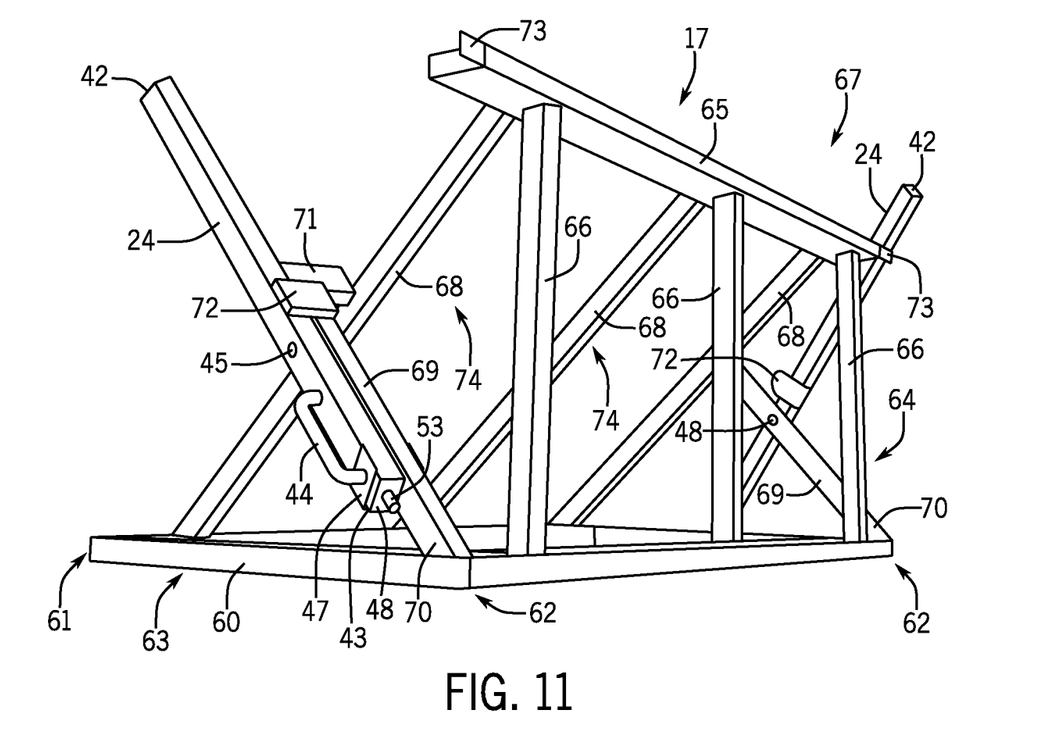
FIG. 11 shows a front perspective view of a front support frame of the present invention with a left side retaining bar in a raised position and a right side retaining bar in a lowered position.
Figure 12:
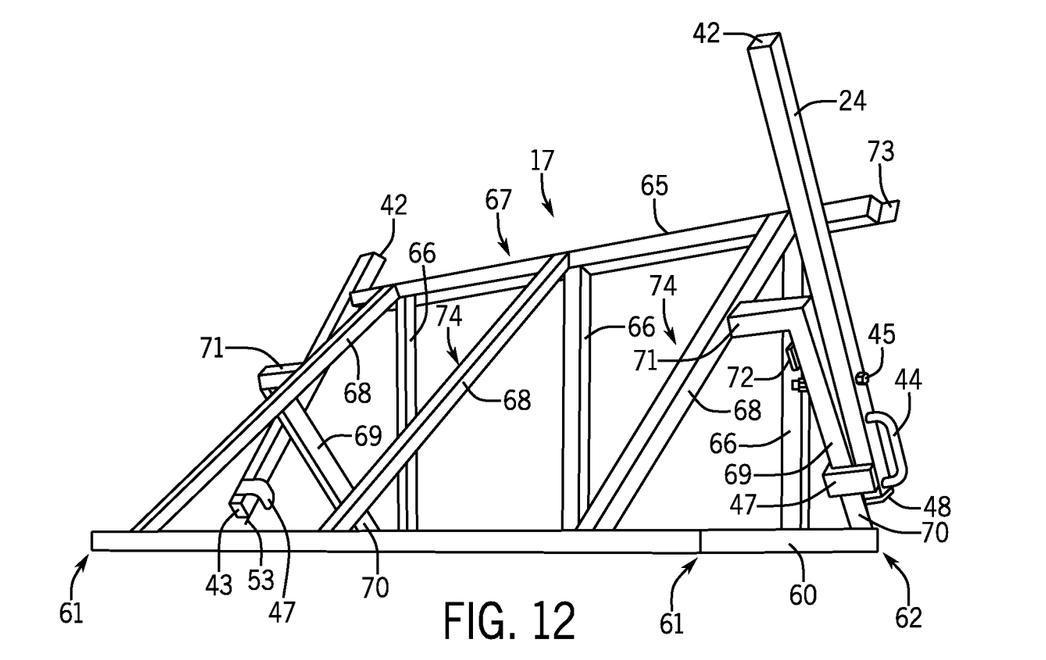
FIG. 12 shows a rear perspective view of the front support frame of FIG. 11.

FIG. 11 shows a front view of the front support frame 17 with a left side retaining bar 24 in a raised position and a right side retaining bar 24 in a lowered position. The front support frame 17 has a bottom frame 60 having a rear end 61, a front end 62, a left side 63, and a right side 64. The front support frame 17 has a top beam 65 which is connected to the front end 62 of the bottom frame 60 with vertical front beams 66 forming a front vertical frame 67, which is the front side of the front support frame 17. Angled rear beams 68 connect the top beam 65 to the rear end 61 of the bottom frame 60, forming a rear side of the front support frame 17. Angled side beams 69 connect the front ends 62 of the bottom frame 60 to a middle area of angled rear beams 68. A bottom end 70 of the angled side beam 69 connects to the front end 62 of the bottom frame 60 and a top end 71 of the angled side beam 69 connects to the angled rear beam 68. A retaining bar 24 is attached rotatably to the angled side beams 69. The structural and functional features of the retaining bar 24 on the front support frame 17 are similar to those shown in FIGS. 3-10 for the middle support frame 18 but include a middle stop member 72. The top beam 65 has a stop member 73 at each of its ends to support the retaining bar 24 in the lowered position. The angled rear beams 68 form retention spaces 74 in the rear side of the front support frame 17. FIG. 12 shows a rear view of the front support frame 17. The front support frame 17 has a generally triangular shape.

Figure 13:
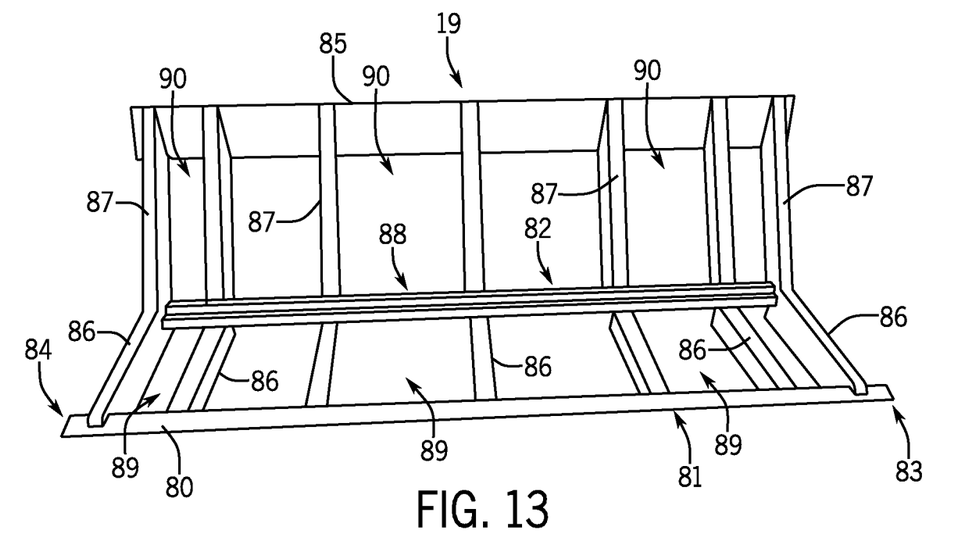
FIG. 13 shows a front perspective view of a rear support frame of the present invention.
Figure 14:
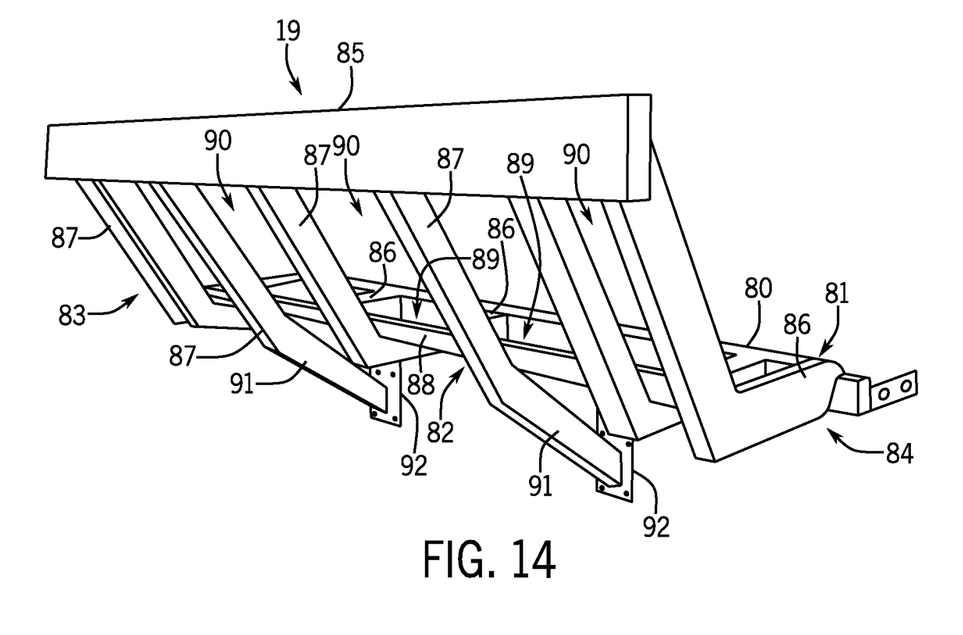
FIG. 14 shows a rear perspective view of the rear support frame of FIG. 13.

FIG. 13 shows a front view of the rear support frame 19. The rear support frame 19 has a bottom frame 80 having a front end 81, a rear end 82, a right side 83 and a left side 84. An angled vertical back frame 85 is attached to the rear end 82 of the bottom frame 80, forming an angled vertical backside of the rear support frame 19. The bottom frame 80 has horizontal cross beams 86 and the angled vertical back frame 85 has angled vertical cross beams 87 which join at a center beam 88. The horizontal cross beams 86 create retention spaces 89 in the bottom frame 80 and the angled vertical cross beams 87 create retention spaces 90 in the angled vertical back frame 85. FIG. 14 shows a rear view of the rear support frame 19 and further shows mounting braces 91 and mounting plates 92 to attach the rear support frame 19 to the rear end 21 of the trailer 10. Preferably, the rear support frame 19 extends beyond the rear end 21 of the trailer 10. The rear support frame 19 has a generally open triangle shape.

Figure 15:
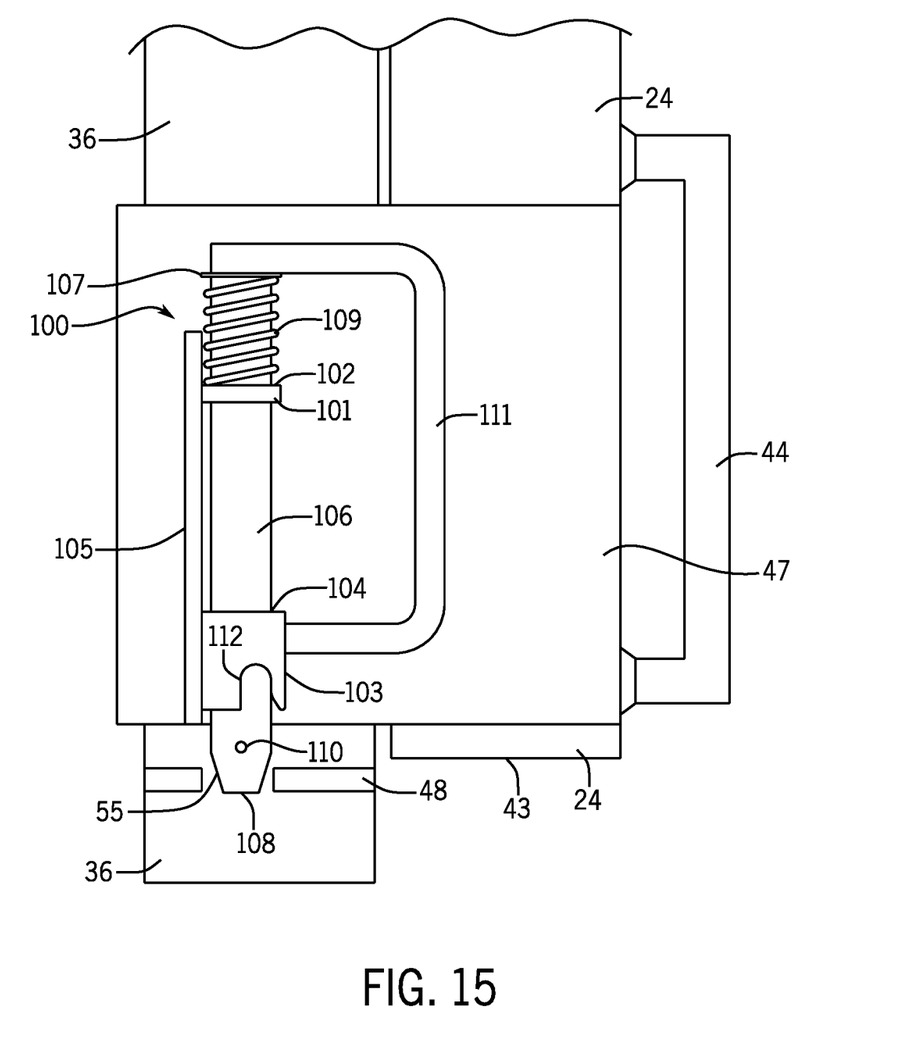
FIG. 15 shows a front view of an alternant embodiment of the locking pin assembly.

FIG. 15 shows a front view of an alternant embodiment 100 of the locking pin assembly 50. The alternant locking pin assembly 100 has a top bracket 101 having a hole 102, a bottom bracket 103 having a hole 104, and a vertical bracket 105 connected to brackets 101 and 103. The brackets 101, 103, and 105 are attached to the stop member 47 on the retaining bar 24, for example by welding. A locking pin 106 having a top end 107 and a bottom end 108 is inserted into brackets 101 and 103 through holes 102 and 104. A spring 109 is positioned between the top end 107 of the locking pin 106 and the top bracket 101. The locking pin 106 has a hole 110 near the bottom end 108 for insertion of a retaining key. A U-shaped handle 111 is attached to the top end 107 of the locking pin 106 and to the locking pin 106 near the bottom end 108.

FIG. 15 shows the bottom end 108 positioned in the hole 55 of the locking pin plate 48. The handle 111 is used to pull the locking pin downwards through the hole 55 while the spring 109 becomes compressed. When the hole 110 is beneath the locking pin plate 48 a retaining key (not shown) can be inserted through the hole 110 to retain the locking pin 106 in the locking pin plate 48. When the retaining key is removed, the compressed spring 109 pushes the locking pin 106 up through the hole 55. The handle 111 is used to pull the bottom end 108 of the locking pin 106 above the locking pin plate 48 to that the retaining bar can be rotated. A latch 112 in the bottom bracket may be used to retain the locking pin 106 above the locking pin plate 48.

As shown in FIG. 2, preferably three middle support frames are placed on the trailer between the front support frame and the rear support frame. Prior to loading a trailer with bales, the retaining bars are rotated to a lowered position. Two bales are placed on the trailer between pairs of middle support frames. One bale is placed adjacent a middle support frame at the front end of the trailer. One bale is placed above each middle support frame. One bale is placed on the front support frame and one bale is placed on the rear support frame. The bales settle into the retention spaces and become embedded therein which prevent them from moving forward and backward and sideways. The front support member restricts forward movement of the bales and the rear support frame prevents backward movement of the bales. The bales on the front support frames and middle support frames are further secured with the retaining bars by rotating the retaining bars to a raised position where they extend across the sides of the bales. The combination of the retention spaces and the retaining bars provides remarkably effective securing of the bales to the trailer for transportation. At the destination, all that is required to unsecure the bales is to lower the retaining bars and lift the bales up from above the middle support forms, up from the trailer bed, and up from the front and rear support frames, by methods well known in the art.

The present invention provides a method for securing cylindrical bales on trailer for transportation. A trailer having a front support frame, a rear support frame, and a plurality of spaced apart middle support frames positioned therebetween is provided. The front support member prevents forward movement of the bales and the rear support frame prevents backward movement of the bales. The middle support frames are trapezoidal shaped. The front support frame and the middle support frame have retaining bars attached rotatably to their sides. The front, rear, and middle support frames each have retention spaces for embedding at least part of a surface of a cylindrical bale when the cylindrical bale engages the support frames.

A cylindrical bale is placed between adjacent middle support frames, above each middle support frame, on the front support frame, on the rear support frame, and between a middle support frame and a front support frame. At least a portion of the surface of each cylindrical bale is embedded into retention spaces of the front, rear, or middle support frames or the cylindrical bale is wedged between adjacent bales that that are embedded. The retaining bars on each side of the front support frame and the middle support frames are rotated to a raised position on each side of the cylindrical bale, further preventing sideways movement of the cylindrical bales. The retaining bars are locked in the raised position and the trailer is secured for transportation. When arriving at the delivery destination the cylindrical bales can be readily unsecured by unlocking and lowering the retaining bars. The cylindrical bales can be easily lifted up and the retention spaces do not restrict the upward movement of the cylindrical bales when they are lifted.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, the support frames can be made of any suitable type of metal or plastic. The support frames can be made in any size and can be reversibly mounted to a trailer bed with any suitable clamping methods.

It will be understood that various changes in the details of the method and materials which have been described and illustrated above in order to explain the nature of this invention may be made by those skilled in the art without departing from the principle and scope of the invention as recited in the following claims.

I claim:

1. A system for securing cylindrical bales on a trailer, comprising:
   a) a plurality of middle support frames, each consisting of a top frame and a bottom frame, each top frame and bottom frame having a first side, a second opposite side, a front end, and a rear end, wherein the bottom frame is reversibly attached to a top surface of the trailer;
   b) the top and bottom frames being spaced apart and connected to each other on their first and second sides with a respective centrally located vertical side beam, thereby forming first and second sides of the middle support frame;
   c) the top and bottom frames connected to each other on their front ends and rear ends with respectively spaced apart angled beams, thereby forming the front end and the rear end of the middle support frame;
   d) the front end and rear end of the top frame being connected to each other with top cross beams, thereby forming a top end of the middle support frame;
   e) a retaining bar attached rotatably to the vertical side beams that prevents an upper bale above the top frame of the middle support frame from moving from one side of the top frame towards the other opposite side of the top frame; and
   f) the spaced apart angled beams forming retaining spaces in the middle support frame, the retaining spaces in the middle support frame causing at least some of the surface of a lower bale to become embedded therein, thereby preventing sideways movement of the lower bale across the front end or the rear end of the middle support frame.

2. The system of claim 1, further comprising a front support frame and a rear support frame, wherein three middle support frames are positioned and spaced apart between the front support frame and the rear support frame.

3. The system of claim 1, further comprising the retaining bar rotating towards the top frame thereby raising the retaining bar to secure the upper bale for transportation and the retaining bar rotating away from the top frame thereby lowering the retaining bar to unsecure the upper bale for removing the upper bale after transportation.

4. The system of claim 1, wherein the retaining bar and the vertical side beam form a locking pin assembly, wherein a locking pin on a bottom end of the retaining bar is biased to extend into a locking pin plate positioned near a bottom end of each said vertical side beam and wherein the locking pin plate has an opening to receive the locking pin, thereby reversibly locking the retaining bar in a raised position.

5. The system of claim 2, wherein the front support frame comprises:
   a) a bottom frame and a top beam which is connected to a front end of the bottom frame with vertical front beams;
   b) angled rear beams which connect the top beam to a rear end of the bottom frame;
   c) angled side beams which connect front ends of the bottom frame to a middle area of angled rear beams;
   d) a retaining bar attached rotatably to the angled side beams;
   e) the angled rear beams forming retention spaces in the front support frame, the retention spaces in the front support frame causing at least some of the surface of a bale on the front support frame to become embedded therein, thereby preventing sideways movement of the bale on the front support frame across the front support frame; and
   f) the front support frame is angled such that the bale on the front support frame cannot move forward beyond a front end of the trailer.

6. The system of claim 2, wherein the rear support frame comprises:

a) a rear support frame having a bottom frame and an angled vertical back frame attached to a rear end of the bottom frame, thereby forming an angled vertical backside of the rear support frame;
b) the bottom frame having horizontal cross beams and the angled vertical back frame having angled vertical cross beams;
c) the horizontal cross beams creating retention spaces in the bottom frame and the angled vertical cross beams creating retention spaces in the angled vertical back frame, the retention spaces in the bottom frame and in the angled vertical back frame causing at least some of the surface of a bale on the rear support frame to become embedded therein, thereby preventing sideways movement of the bale on the rear support frame across the rear support frame; and
d) the rear support frame is angled so that the bale on the rear support frame cannot move backward beyond a rear end of the trailer.

7. The system of claim 1, wherein the middle support frame has a trapezoidal shape.

8. The system of claim 2, wherein a circular bale weighing 5,000 to 6,000 pounds is placed above each middle support frame, between adjacent middle support frames, between a middle support frame and the front support frame, on the front support frame, and on the rear support frame.

9. A system for securing cylindrical bales on a trailer, comprising:
a) a plurality of middle support frames, each consisting of a top frame and a bottom frame, each top frame and bottom frame having a first side, a second opposite side, a front end, and a rear end, wherein the bottom frame is reversibly attached to a top surface of the trailer;
b) the top and bottom frames being spaced apart and connected to each other on their first and second sides with a respective centrally located vertical side beam, thereby forming first and second sides of the middle support frame;
c) the top and bottom frames connected to each other on their front ends and rear ends with respectively spaced apart angled beams, thereby forming the front end and the rear end of the middle support frame;
d) the front end and rear end of the top frame being connected to each other with top cross beams, thereby forming a top end of the middle support frame;
e) a retaining bar attached rotatably to the vertical side beams that prevents an upper bale above the top frame of the middle support frame from moving from one side of the top frame towards the other opposite side of the top frame;
f) the spaced apart angled beams forming retaining spaces in the middle support frame, the retaining spaces in the middle support frame causing at least some of the surface of a lower bale to become embedded therein, thereby preventing sideways movement of the lower bale across the front end or the rear end of the middle support frame;
g) the retaining bar rotating towards the top frame thereby raising the retaining bar to secure the upper bale for transportation and the retaining bar rotating away from the top frame thereby lowering the retaining bar to unsecure the upper bale for removing the upper bale after transportation; and
h) the retaining bar and the vertical side beam forming a locking pin assembly, wherein a locking pin on a bottom end of each said retaining bar is biased to extend into a locking pin plate positioned near a bottom end of the vertical side beam and wherein the locking pin plate has an opening to receive the locking pin, thereby reversibly locking the retaining bar in a raised position.

10. The system of claim 9, further comprising a front support frame and a rear support frame, wherein three middle support frames are positioned and spaced apart between the front support frame and the rear support frame.

11. The system of claim 10, wherein the front support frame comprises:
a) a bottom frame and a top beam which is connected to a front end of the bottom frame with vertical front beams;
b) angled rear beams which connect the top beam to a rear end of the bottom frame;
c) angled side beams which connect front ends of the bottom frame to a middle area of angled rear beams;
d) a retaining bar attached rotatably to the angled side beams;
e) the angled rear beams forming retention spaces in the front support frame, the retention spaces in the front support frame causing at least some of the surface of a bale on the front support frame to become embedded therein, thereby preventing sideways movement of the bale on the front support frame across the front support frame; and
f) the front support frame is angled such that the bale on the front support frame cannot move forward beyond a front end of the trailer.

12. The system of claim 10, wherein the rear support frame comprises:
a) a rear support frame having a bottom frame and an angled vertical back frame attached to a rear end of the bottom frame, thereby forming an angled vertical backside of the rear support frame;
b) the bottom frame having horizontal cross beams and the angled vertical back frame having angled vertical cross beams;
c) the horizontal cross beams creating retention spaces in the bottom frame and the angled vertical cross beams creating retention spaces in the angled vertical back frame, the retention spaces in the bottom frame and in the angled vertical back frame causing at least some of the surface of a bale on the rear support frame to become embedded therein, thereby preventing sideways movement of the bale on the rear support frame across the rear support frame; and
d) the rear support frame is angled so that the bale on the rear support frame cannot move backward beyond a rear end of the trailer.

13. The system of claim 9, wherein the middle support frame has a trapezoidal shape.

14. The system of claim 10, wherein a circular bale weighing 5,000 to 6,000 pounds is placed above each middle support frame, between adjacent middle support frames, between a middle support frame and the front support frame, on the front support frame, and on the rear support frame.

15. A system for securing cylindrical bales on a trailer, comprising:
a) a plurality of middle support frames, each consisting of a top frame and a bottom frame, each top frame and bottom frame having a first side, a second opposite side, a front end, and a rear end, wherein the bottom frame is trapezoidal shaped and is reversibly attached to a top surface of the trailer;

b) the top and bottom frames being spaced apart and connected to each other on their first and second sides with a respective centrally located vertical side beam, thereby forming first and second sides of the middle support frame;

c) the top and bottom frames connected to each other on their front ends and rear ends with respectively spaced apart angled beams, thereby forming the front end and the rear end of the middle support frame;

d) the front end and rear end of the top frame being connected to each other with top cross beams, thereby forming a top end of the middle support frame;

e) a retaining bar attached rotatably to the vertical side beams that prevents an upper bale above the top frame of the middle support frame from moving from one side of the top frame towards the other opposite side of the top frame;

f) the spaced apart angled beams forming retaining spaces in the middle support frame, the retaining spaces in the middle upper frame causing at least some of the surface of a lower bale to become embedded therein, thereby preventing sideways movement of the lower bale across the front end or the rear end of the middle support frame;

g) the retaining bar rotating towards the top frame thereby raising the retaining bar to secure the upper a bale for transportation and the retaining bar rotating away from the top frame thereby lowering the retaining bar to unsecure the upper bale for removing the upper bale after transportation;

h) the retaining bar and the vertical side beam forming a locking pin assembly, wherein a locking pin on a bottom end of the retaining bar is biased to extend into a locking pin plate positioned near a bottom end of each said vertical side beam and wherein the locking pin plate has an opening to receive the locking pin, thereby reversibly locking the retaining bar in a raised position; and i) a front support frame and a rear support frame, wherein three middle support frames are positioned and spaced apart between the front support frame and the rear support frame.

16. The system of claim 15, wherein the front support frame comprises:

a) a bottom frame and a top beam which is connected to a front end of the bottom frame with vertical front beams;

b) angled rear beams which connect the top beam to a rear end of the bottom frame;

c) angled side beams which connect front ends of the bottom frame to a middle area of angled rear beams;

d) a retaining bar attached rotatably to the angled side beams;

e) the angled rear beams forming retention spaces in the front support frame, the retention spaces in the front support frame causing at least some of the surface of a bale on the front support frame to become embedded therein, thereby preventing sideways movement of the bale on the front support frame across the front support frame; and f) the front support frame is angled such that the bale on the front support frame cannot move forward beyond a front end of the trailer.

17. The system of claim 15, wherein the rear support frame comprises:

a) a rear support frame having a bottom frame and an angled vertical back frame attached to a rear end of the bottom frame, thereby forming an angled vertical backside of the rear support frame;

b) the bottom frame having horizontal cross beams and the angled vertical back frame having angled vertical cross beams;

c) the horizontal cross beams creating retention spaces in the bottom frame and the angled vertical cross beams creating retention spaces in the angled vertical back frame, the retention spaces in the bottom frame and in the angled vertical back frame causing at least some of the surface of a bale on the rear support frame to become embedded therein, thereby preventing sideways movement of the bale on the rear support frame across the rear support frame; and d) the rear support frame is angled so that the bale on the rear support frame cannot move backward beyond a rear end of the trailer.

18. The system of claim 15, wherein a circular bale weighing 5,000 to 6,000 pounds is placed above each middle support frame, between adjacent middle support frames, between a middle support frame and the front support frame, on the front support frame, and on the rear support frame.

19. A system for securing cylindrical bales on a trailer, comprising:

a) a plurality of middle support frames, each consisting of a top frame and a bottom frame, each top frame and bottom frame having a first side, a second opposite side, a front end, and a rear end, wherein the bottom frame is trapezoidal shaped and is reversibly attached to a top surface of the trailer;

b) the top and bottom frames being spaced apart and connected to each other on their first and second sides with a respective centrally located vertical side beam, thereby forming first and second sides of the middle support frame;

c) the top and bottom frames connected to each other on their front ends and rear ends with respectively spaced apart angled beams, thereby forming the front end and the rear end of the middle support frame;

d) the front end and rear end of the top frame being connected to each other with top cross beams, thereby forming a top end of the middle support frame;

e) a retaining bar attached rotatably to the vertical side beams that prevents an upper bale above the top frame of the middle support frame from moving from one side of the top frame towards the other opposite side of the top frame;

f) the spaced apart angled beams forming retaining spaces in the middle support frame, the retaining spaces in the middle support frame causing at least some of the surface of a lower bale to become embedded therein, thereby preventing sideways movement of the lower bale across the front end or the rear end of the middle support frame;

g) the retaining bar rotating towards the top frame thereby raising the retaining bar to secure the upper a bale for transportation and the retaining bar rotating away from the top frame thereby lowering the retaining bar to unsecure the upper bale for removing the upper bale after transportation;

h) the retaining bar and the vertical side beam forming a locking pin assembly, wherein a locking pin on a bottom end of the retaining bar is biased to extend into a locking pin plate positioned near a bottom end of each said vertical side beam and wherein the locking pin plate has an opening to receive the locking pin, thereby reversibly locking the retaining bar in a raised position; and i) a front support frame and a rear support frame, wherein three middle support frames are positioned and spaced apart between the front support frame and the rear support frame;

wherein the front support frame comprises:
1) a bottom frame and a top beam which is connected to a front end of the bottom frame with vertical front beams;
2) angled rear beams which connect the top beam to a rear end of the bottom frame;
3) angled side beams which connect front ends of the bottom frame to a middle area of angled rear beams;
4) a retaining bar attached rotatably to the angled side beams;
5) the angled rear beams forming retention spaces in the front support frame, the retention spaces in the front support frame causing at least some of the surface of a bale on the front support beam to become embedded therein, thereby preventing sideways movement of the bale on the front support frame across the front support frame; and
6) the front support frame is angled such that the bale on the front support frame cannot move forward beyond a front end of the trailer and wherein the rear support frame comprises:
1) a rear support frame having a bottom frame and an angled vertical back frame attached to a rear end of the bottom frame, thereby forming an angled vertical backside of the rear support frame;
2) the bottom frame having horizontal cross beams and the angled vertical back frame having angled vertical cross beams;
3) the horizontal cross beams creating retention spaces in the bottom frame and the angled vertical cross beams creating retention spaces in the angled vertical back frame, the retention spaces in the bottom frame and in the angled vertical back frame causing at least some of the surface of a bale on the rear support frame to become embedded therein, thereby preventing sideways movement of the bale on the rear support frame across the rear support frame; and
4) the rear support frame is angled so that the bale on the rear support frame cannot move backward beyond a rear end of the trailer.

20. The system of claim 19, wherein a circular bale weighing 5,000 to 6,000 pounds is placed above each middle support frame, between adjacent middle support frames, between a middle support frame and the front support frame, on the front support frame, and on the rear support frame.

* * * * *